United States Patent [19]

Kirwan

[11] 4,013,043

[45] Mar. 22, 1977

[54] MILKING APPARATUS

[76] Inventor: Patrick William Kirwan, Kilnagrange, Kilmacthomas, County Waterford, Ireland

[22] Filed: May 27, 1975

[21] Appl. No.: 580,811

[30] Foreign Application Priority Data

May 27, 1974 Ireland ............................... 1119/74
Nov. 8, 1974 Ireland ............................... 2298/74

[52] U.S. Cl. .............................. 119/14.09; 165/143
[51] Int. Cl.² ........................................... A01J 5/04
[58] Field of Search ......... 119/14.09, 14.18, 14.01, 119/14.02, DIG. 1; 165/143

[56] References Cited

UNITED STATES PATENTS

| 1,067,505 | 7/1913 | Dalzell et al. | 165/143 |
| 3,800,062 | 3/1974 | Kabaoka et al. | 165/143 |

*Primary Examiner*—Jay N. Eskovitz
*Attorney, Agent, or Firm*—Young & Thompson

[57] ABSTRACT

The invention relates to milking apparatus in which the milk line and droppers, which convey milk under vacuum from teat-cup clusters to a receiving jar, are enclosed over their major length in a water-jacket through which water is directed in a direction contrary to the flow of milk. In this way the milk is pre-cooled before it is received in the receiving jar and frothing of the milk in the receiving jar is reduced so eliminating contamination of the vacuum line by froth. The water jacket is provided with warm-water outlets for drawing off warm water from the water-jacket for washing purposes.

6 Claims, 9 Drawing Figures

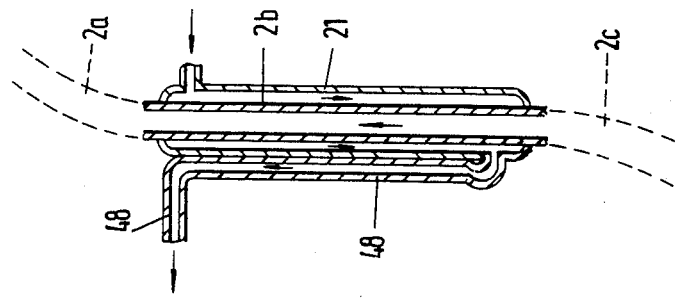
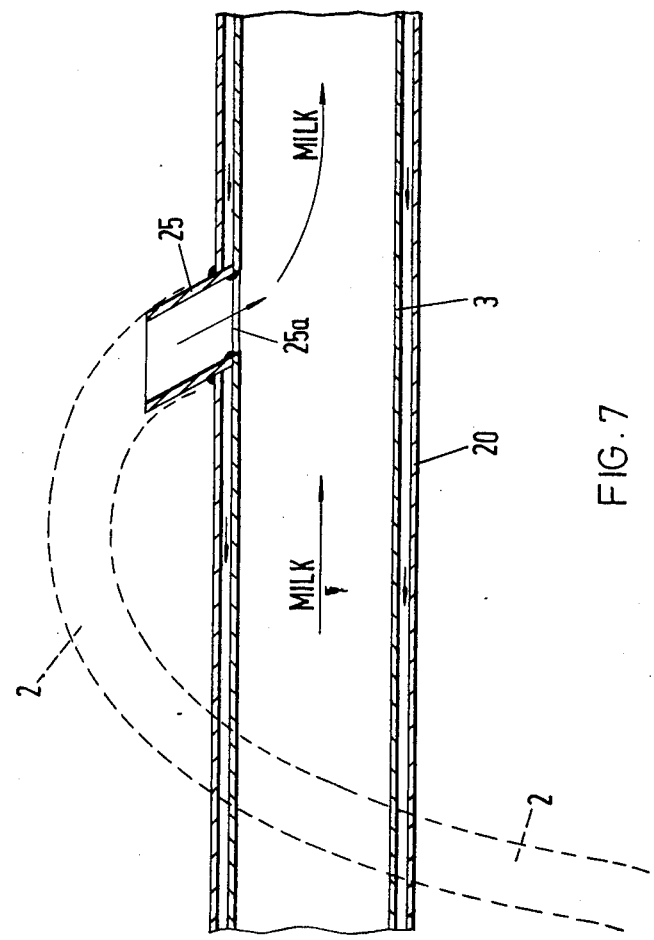

MILKING APPARATUS

The present invention relates to milking apparatus.

In conventional milking machines milk is drawn from the udder through teat-cups and each set of teat-cups is connected by a pipeline, called a dropper, to a milk line which leads to a milk-receiving jar or releaser. A second pipeline leads from the receiving vessel via a sanitary trap to a vacuum pump so that, when the milking machine is in operation, the milk line and droppers are under constant vacuum. The receiving vessel acts to "separate" the milk from the vacuum and the milk so separated is pumped by a milk pump to a bulk storage tank. The milk is usually of a temperature of about 36° C when it leaves the cow and it is the recommended practice to cool the milk to a temperature below 16° C by means of a precooler such as a plate cooler provided between the receiving jar and the bulk storage tank. The milk is then cooled to, and retained at, a temperature of about 4° C in the bulk tank by an immersion cooler. Thus, a supply of electricity is required for operating the cooler and a supply of electricity or other form of energy is also required in the milking parlor to operate a heater for warming water for use in washing the cows' udders and for other purposes. Furthermore, the conventional milking apparatus suffers from the disadvantage that considerable frothing of the milk usually occurs in the receiving jar and it is not unusual to find that some froth or milk vapor finds its way into the vacuum pipe, which is not subject to the usual washing operation, and so forms a source of bacterial contamination of milk subsequently received in the receiving jar.

It is an object of the invention to overcome these disadvantages and to provide means for pre-cooling the milk while it is flowing under vacuum in the milk line between the teat-cups and the receiving jar and to utilise the heat present in the milk when it is received from the cow to warm water for cleaning and other purposes.

Accordingly, the invention provides milking apparatus comprising milk line adapted to convey milk under vacuum from a teat-cup cluster to a receiving vessel, wherein the major length of the milk line is enclosed in a water-jacket such that when cold water is directed through the water-jacket in a direction contrary to the direction of flow of the milk the apparatus acts as a heating exchanger to cool the milk and heat the water above ambient temperature. Preferably, the dropper lines connecting the teat-cup clusters to the milking line are also enclosed in water-jackets.

It has been found that by pre-cooling the milk before it is received in the milk receiving vessel little or no frothing occurs and contamination of the vacuum line is eliminated. Furthermore, by regulating the flow of water through the cooling jacket the water may be heated to near the body temperature of the cow and can be drawn off at intervals for washing purposes. A very important factor in the milking operation is a constant supply of warm water at body temperature, and as modern dairy practice is to substitute a cold sterilising liquid for the hot water used to wash the milk line and other parts of the installation, all the warm water required for washing the udders etc., can be obtained by the invention, so eliminating the use of a water-heater in the milking parlor. In this way there is a considerable saving in energy. Furthermore the plate cooler may be eliminated or its operation considerably reduced. The pre-cooling of the milk by the apparatus of the invention permits the use of a smaller refrigeration unit in the bulk-tank and so cuts the cost of the bulk-tank as well as overall operating costs. It also ensures partial cooling of the milk in the event of a breakdown of the refrigeration unit or electrical power failure and this can be important because where dairy hygiene is good, milk cooled to 16° C, which is possible with the apparatus of the invention, can be stored for up to 20 hours without serious loss of quality. With the apparatus of the invention cooling of the milk commences nearer the cows' udders than with any known form of cooler, and unlike conventional coolers the milk may flow direct to the bulk-tank without any appreciable turbulence or agitation which minimises the risk of rancidity or lipolysis and pre-cooling is achieved. without restricting air-flow in the milk line. Finally, since the milk line is an intrinsic part of the cooler, there is no additional cooler surface area to be washed and the standard pipeline milking plant cleaning procedure is adequate.

In one embodiment of the invention the water-jacket is divided into consecutive lengths leaving short sections of the milk line uncovered so as to facilitate connection to the milk line of the droppers leading to the teat-cup clusters, each length of the water-jacket being connected to the following length by a water-pipe. In an alternative arrangement the milk line is, where possible, enclosed in one continuous water-jacket, apertures being provided at spaced intervals to allow for connection of the milk line to the droppers, the aperture around the connection being sealed with a weld or the like. In this embodiment the droppers are provided with individual water-jackets.

The water-jacket preferably comprises a tubular steel pipe which is arranged co-axially with the inner milk line which is also tubular and is preferably of austentic stainless steel. In order to provide for optimum heat transfer it is important that there should be only a comparatively thin layer of water, preferably under pressure, in contact with the milk line and so the cross-sectional area of the water-carrying annular space between the outer and inner pipes should be substantially less than the cross-sectional area of the inner pipe. For example, the diameters of the outer and inner pipes may be in the ratio of 6 : 5. When the milk line is lying in a substantially horizontal plane the milk will flow along the lower half of the tube and so in such a case the water-jacket may be disposed in an eccentric relationship to the milk line so that while the water flows in a thin stream through the narrow jacket space surrounding the milk line, the bulk of the cooling water is in immediate contact with the lower half of the milk line.

Some embodiments of the invention will now be described with reference to the accompanying drawings wherein:

FIG. 7 is a sectional elevation, to an enlarged scale, of a detail of the milk line of FIG. 6 showing the connection between the milk line and the dropper line.

FIG. 9 is a sectional elevation of a dropper line fitted with a water-jacket in accordance with the invention.

Figure 1:
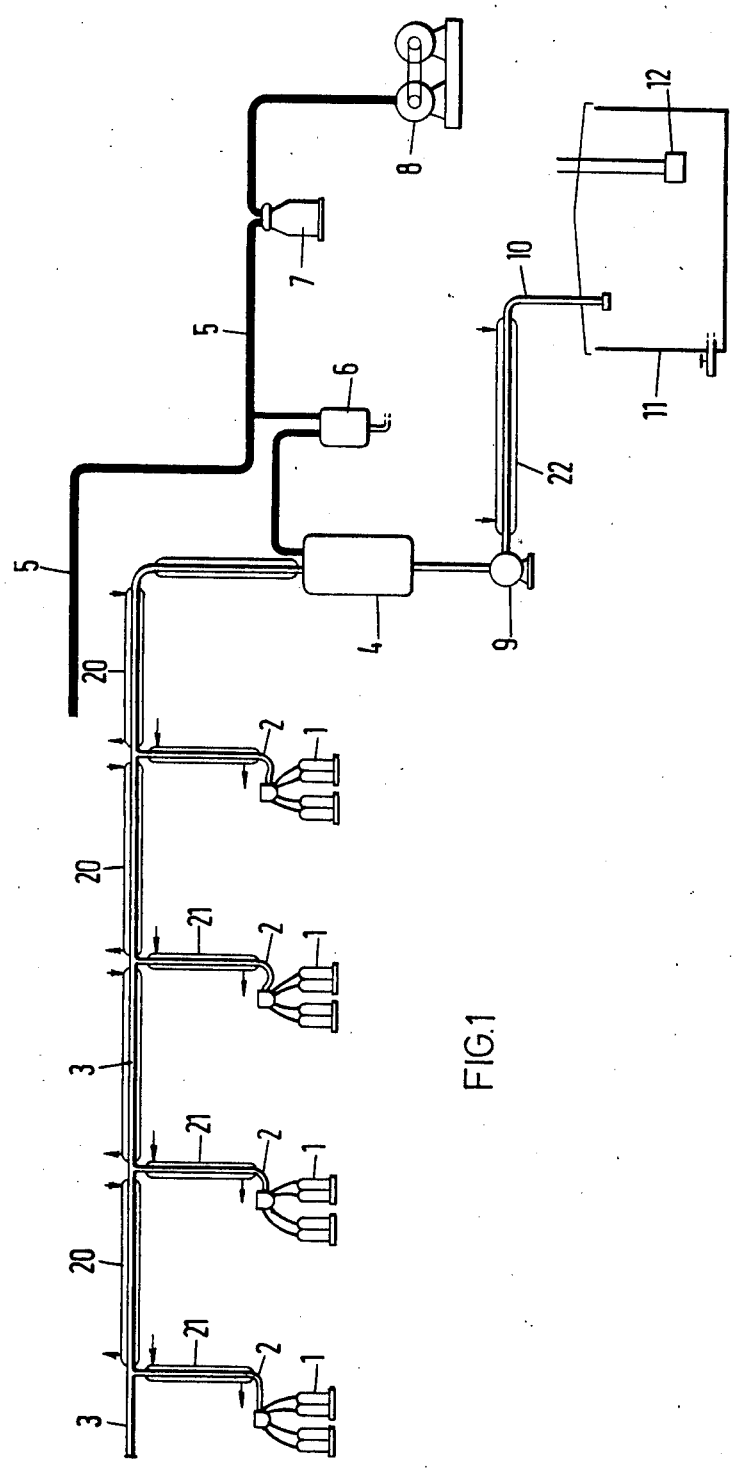
FIG. 1 is a diagrammatic illustration of a milking installation fitted with the apparatus of the invention.

Referring to FIG. 1 of the drawings, this shows a conventional pipeline milking installation comprising a number of teat-cup clusters 1 which are connected by droppers 2 to a milk line 3. Each teat-cup cluster 1 comprises four teat-cups and when the milking machine is in operation the teat-cups are placed on the cows' teats and milking commences. Milk is drawn from the teat-cups through the droppers 2 and into the milk line 3, which leads to a receiving jar 4. A vacuum pipeline 5 leads from the top of the receiving jar via a sanitary trap 6 and an interceptor 7 to a vacuum pump 8. Thus, the milk line 3 and droppers 2 are under constant vacuum and it is this vacuum which acts to draw the milk into the receiving jar. When the milk is received in the receiving jar it falls towards the bottom of the jar and is thus separated from the vacuum. When the milk reaches a certain level in the jar, a milk pump 9 is activated and pumps the milk through a second milk line 10 into a bulk tank 11. In the conventional milking apparatus a plate cooler is usually provided between the milk pump 9 and the bulk tank 11 to pre-cool the milk to below 16° C and the bulk tank itself is provided with an immersion cooler 12 to further cool the milk to about 4° C and maintain it at that temperature until it is collected from a tanker. However, it has been found with this conventional system that considerable frothing occurs in the receiving jar and that quite frequently froth or milk vapour is sucked into the vacuum line 5 and lodges in the sanitary trap 6. The vacuum line 5 is not washed after each milking as in the case with the milk lines and so any milk which lodges in this vacuum line quickly becomes rancid and forms a source of bacterial contamination of milk subsequently received in the receiving jar.

In accordance with the invention the milk line 3 is provided with a water-jacket and in the embodiment shown in FIG. 1 the water-jacket is broken into a number of consecutive lengths 20. The droppers 2 are also each provided with a water-jacket 21. Cold water is passed through the water-jackets in a direction contrary to the flow of milk and so the water-jackets act as heat-exchangers to cool the milk, and to heat the water above ambient temperature. The water may be drawn off at intervals from any of the water-jackets and by controlling the flow of water through individual jackets, heating of the water up to a temperature of about 35° C may be obtained. This water may be used for washing the cow's udders or for other purposes. Furthermore, it has been found that by using the apparatus of the invention the milk received from the cow may be cooled to a temperature of below 16° C by the time it is received in the receiving jar with the result that little or no frothing of the milk occurs in the receiving jar and contamination of the vacuum line is thereby avoided. If desired, further water-jackets 22 may be provided on the milk line 10 between the milk pump and the bulk tank 11. Thus, using the apparatus of the invention, the usual plate cooler located between the milk pump and the bulk tank may be dispensed with.

Although only four teat-cup cluster units are shown in FIG. 1, it will be appreciated that up to fourteen, or more, can be utilised depending on the type and size of the milking installation. Furthermore, for the sake of clarity, portion of the vacuum line and pulsators connected to the interior of the teat-cups have been omitted from the drawings. The washing line has also been omitted. Although the invention is described with reference to receiving jars it will be appreciated that it is equally applicable to releaser-type installations.

Figure 2:
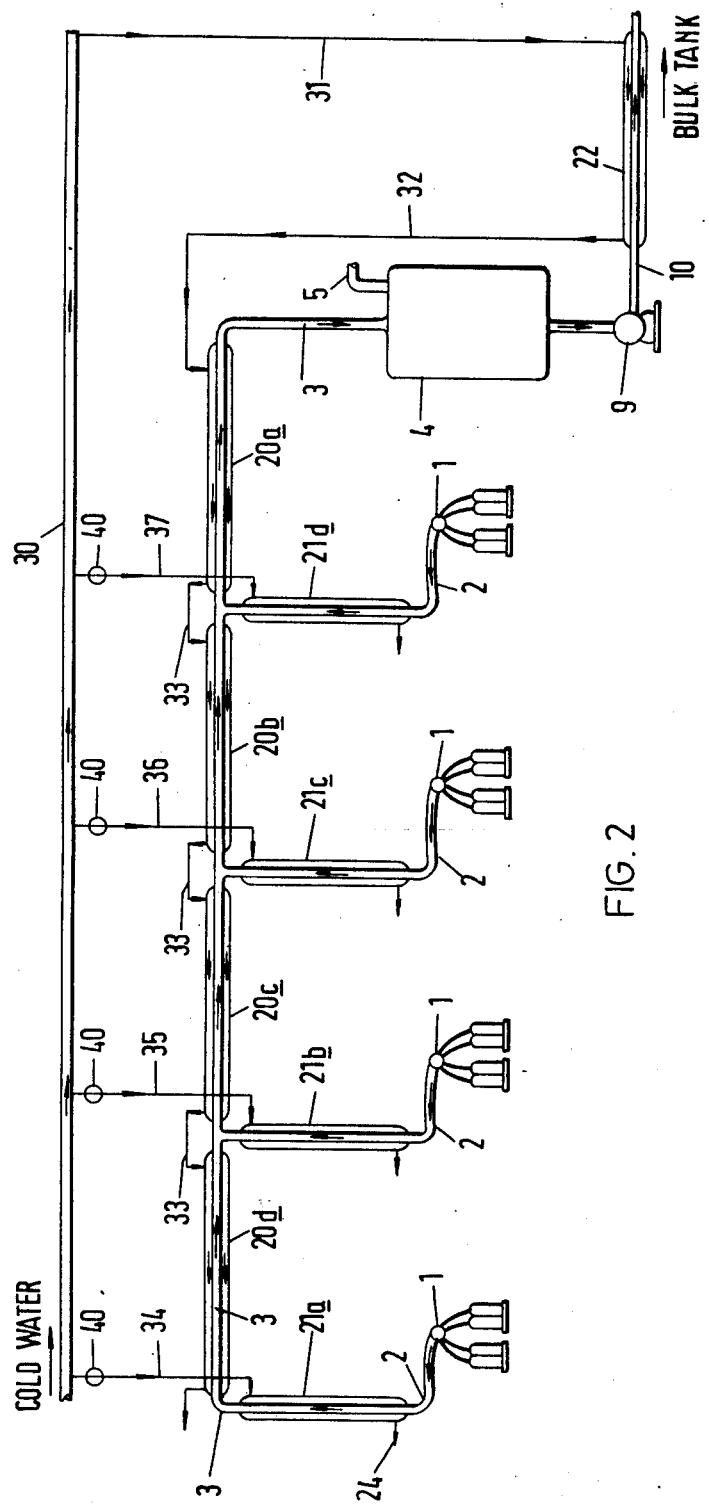
FIG. 2 is a diagrammatic illustration of one embodiment of the invention.

Referring now to FIG. 2, this shows the plumbing arrangement of a first embodiment of the invention. In this embodiment cold water for the water-jackets is supplied from a pressure pump or other suitable water-supplying means, preferably at a pressure of up to 40 p.s.i., through a 1 inch diameter galvanised steel or plastics water-pipe 30. A water-line 31 leads from the end of the pipe 30 to the inlet of water-jacket 22 on the milk line 10. The cold water flows along the water-jacket 22 in a direction contrary to the flow of milk and a second water line 32 leads from the outlet of water-jacket 22 to the inlet of the water-jacket on the milk line 3. In this embodiment the water-jacket on the milk line 3 is broken into a number of consecutive lengths 20a, 20b, 20c and 20d to facilitate connection of the dropper lines to the milk line. The cold water from the water-jacket 22 flows through line 32 into and along water-jacket 20a, again in a direction contrary to the direction of flow of the milk along the milk line. From 20a the water flows through a connecting pipe 33 into the next water-jacket 20b and so on along the milk line until the water exits from water-jacket 20d. Water-lines 34, 35, 36 and 37 also lead from the water-pipe 30 to the inlets of water-jackets 21a, 21b, 21c and 21d on the dropper lines 2, respectively. Each of the water-lines 34, 35, 36 and 37 is provided with a gate valve 40. The water flows down each of the water-jackets 21 and exits through an outlet 24 at the bottom of each water-jacket. Each outlet 24 may, if desired, be provided with a washing hose which is conveniently positioned adjacent the teat-cup cluster so that water from the hose can be used for washing the cows' udders. Alternatively, each of the outlets 24 can be connected to a common warm water pipe (not shown) to which water hoses may be connected at spaced intervals for washing purposes.

The milk received from the cow will be warmest while passing up through the droppers 2 and so maximum heating of the water may be obtained in the water-jackets 21 surrounding the droppers. Thus, for example, the operator can isolate any or all of the water-jackets 21a, 21b, 21c or 21d by closing the gate valve 40 thus achieving maximum heating of the water in these water-jackets, and the warm water from these jackets, which will be at a temperature in the region of 35° C, can be drawn off through the outlet 24. Cooling of the milk is then achieved in the milk line 3 by the water-jackets 20a, 20b, 20c and 20d. If the water outlets from the jackets 21 lead to a common warm-water pipe then hoses, preferably of the kind made in accordance with U.K. Pat. No. 943,760 and sold under Trade Mark "Kinkit" may be connected to the warm-water pipe at spaced intervals. For example, a hose may conveniently be disposed between each pair of teat-cup cluster units.

Figure 4:
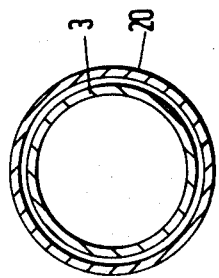
FIG. 4 is a cross-sectional view on the line X—X of FIG. 3.
Figure 3:
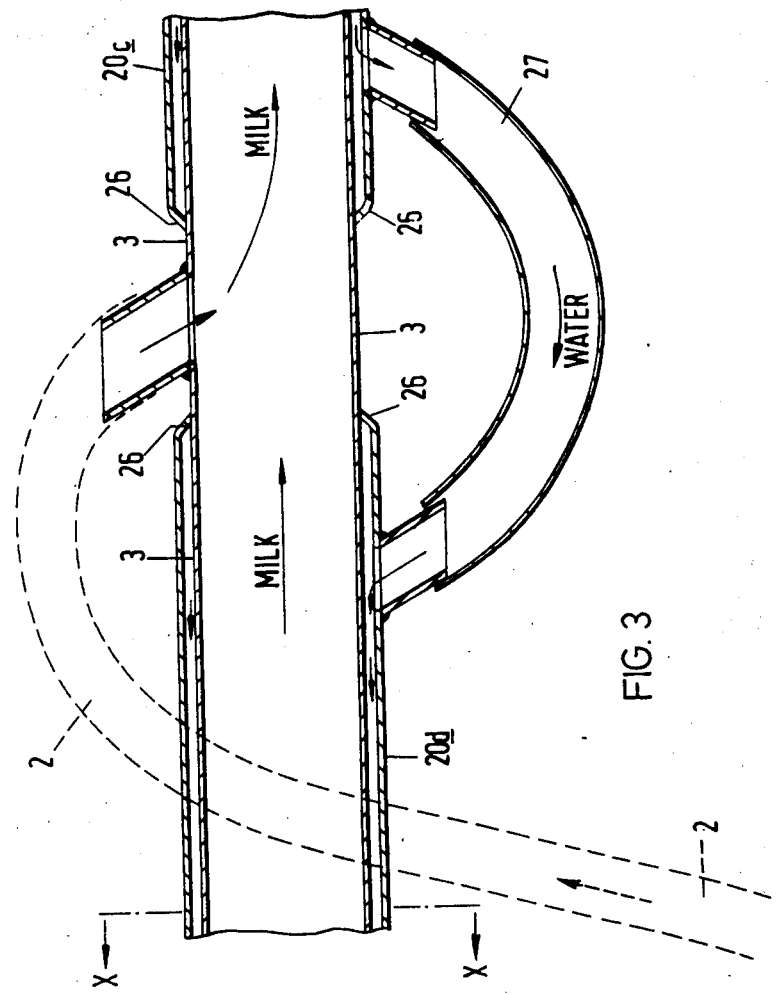
FIG. 3 is a sectional elevation, to an enlarged scale, of a detail of FIG. 2.

Referring now to FIGS. 3 and 4, these show, to full scale, the connection between the milk line 3 and the dropper 2. The milk line 3 is a tubular pipe made from austentic stainless steel and is surrounded by a concentrically disposed tubular water-jacket 20 wwhich may also be of stainless steel. The annular space between the two tubular pipes should be kept to a minimum so as to restrict the volume of water in the water-jacket. For example, the inner milk line 3 may be of a diameter of 1¼ inches while the outer water-jacket 20 has a diameter of 1½ inches. To provide for maximum heat transfer the wall thickness of the milk line 3 may be kept as small as possible. Because of the protection afforded by the outer water-jacket 20 the wall thickness of the milk line 3 may be less than is usual with conventional installations and may be, for example, less than 1 mm in thickness.

The dropper 21 is preferably connected to the top one-third of the milk line 3 and, as shown, the inlet to the milk line to which the dropper is connected, in well-known manner, is angled in the direction of milk flow. To facilitate this connection the milk line 3 is left uncovered by the water-jacket in this region and so the ends of the water-jacket 26 are pressed in and welded to the outer wall of the milk line 3, to form two consecutive water-jackets 20b and 20c. Consecutive water-jackets are connected by means of a connecting pipe 27 which is suitably of plastics material.

Figure 5:
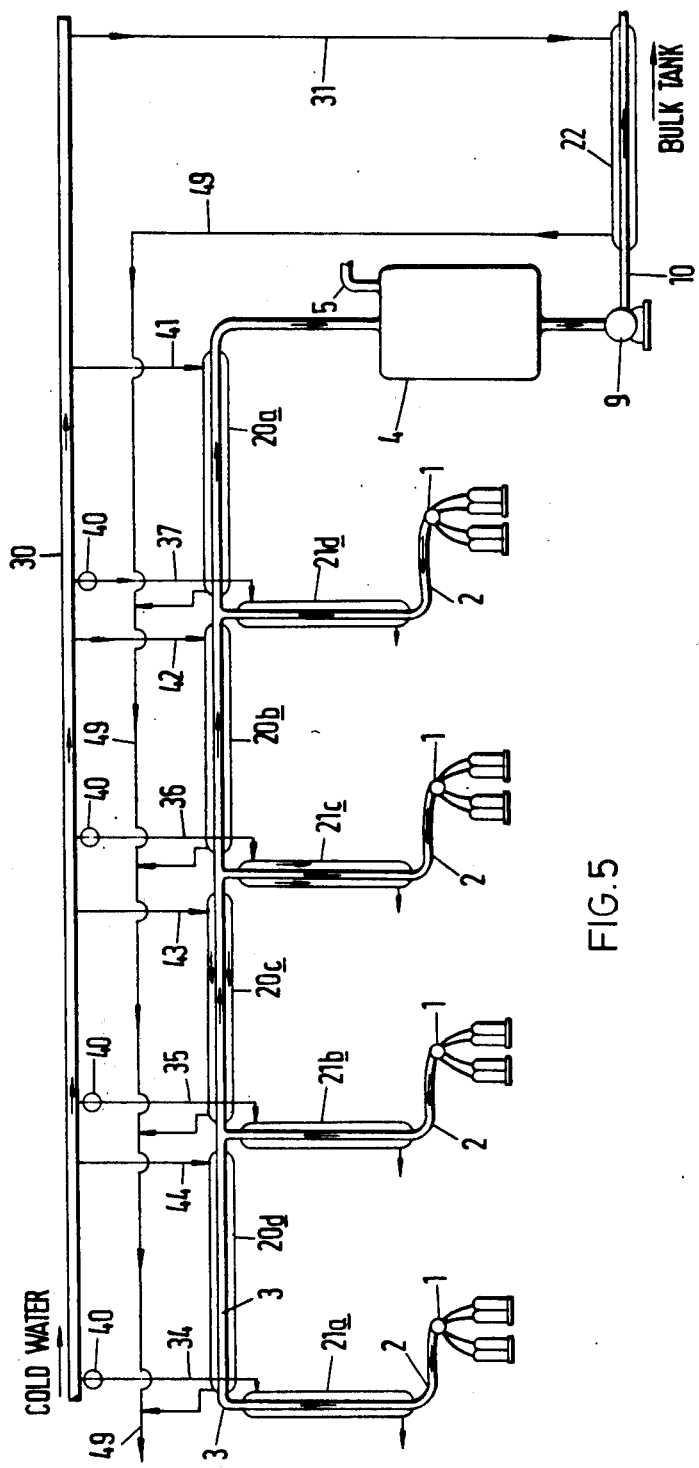
FIG. 5 is a diagrammatic illustration of a second embodiment of the invention.

Referring now to FIG. 5 of the drawings, this shows a second embodiment of the invention. In this embodiment the piping arrangement is similar to that shown in FIG. 2 except that the inlet of each water-jacket section 20a, 20b, 20c and 20d has an individual connection to the water pipe 30 by means of lines 41, 42, 43 and 44. The exits from each of the water pipes may be connected to a common warm-water pipe 49 to feed individual warm-water hoses arranged in the milking stalls. Alternatively, the warm-water pipe can lead to a calf-house or piggery where the water may be used for making-up feeds from milk concentrates and the like.

In this case, the warm-water from the water-jackets 21 surrounding the droppers may be used for washing purposes in the milk parlour as described with reference to FIG. 2. Another arrangement would be to connect the warm-water hoses directly to the outlets of water-jackets 20a, 20b, 20c and 20d for use in the milking parlour. It will be appreciated that with this embodiment control of water flow through individual jackets on the milk line can be controlled by gate valves or other means so that the operator can decide whether to use these water-jackets primarily for cooling or heating.

Figure 6:
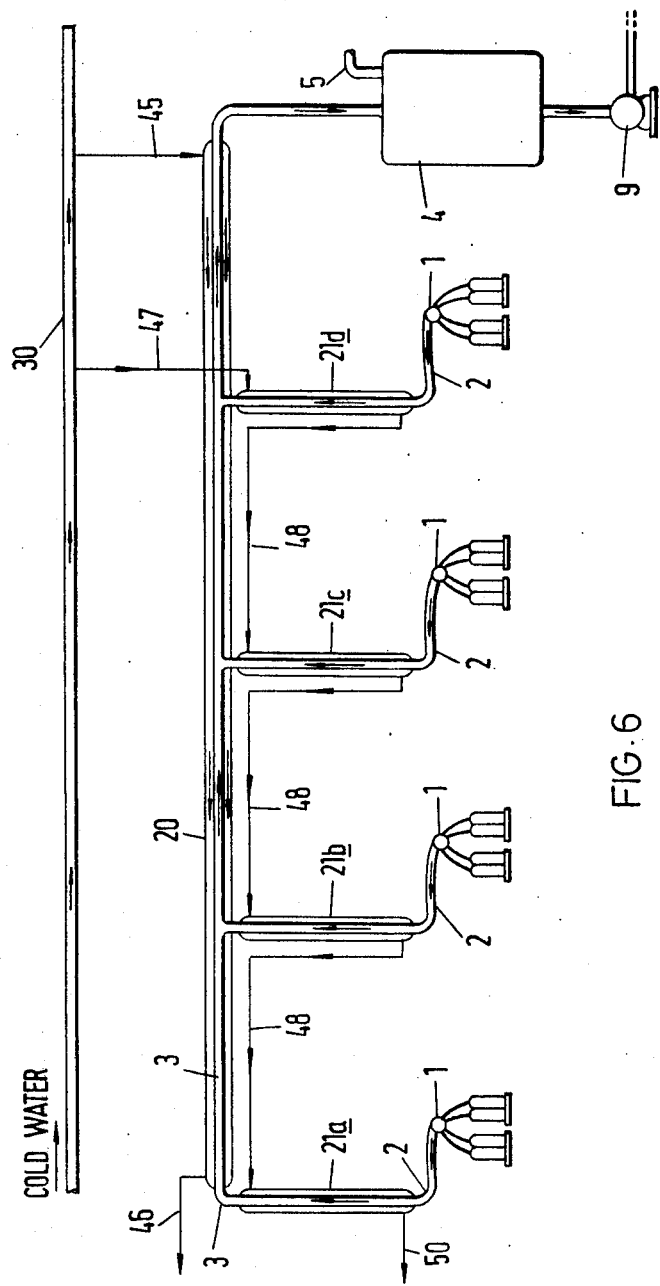
FIG. 6 is a diagrammatic illustration of a third embodiment of the invention.

Referring now to FIG. 6, this shows a third embodiment of the invention in which the water-jacket 21 is not broken into consecutive lengths but is of one continuous length. The water-pipe 30 is connected by water line 45 to the water-jacket 21 and the water flows along the jacket contrary to the flow of milk until it reaches outlet line 46. In this embodiment the water-jackets 21a, 21b, 21c and 21d on the dropper are connected in series. The water-pipe 30 is connected to the top of water-jacket 21d by means of a water line 47. The water flows down jacket 21d and through an outlet at the bottom and then by means of a connecting line 48 to the top of the next section 21e, and so on until the water leaves the final water-jacket 21a by means of an outlet line 50. It will be appreciated that the greater heating of the water occurs in the water-jackets 21 surrounding the droppers so that the water leaving line 50 can be used for washing purposes in the milking parlour. Thus the water-jacket 20 on the milk line 3 can be used primarily for cooling and so can have a higher velocity than that flowing through water-jackets 21. Thus water line 46 can be connected directly to piggeries, calf houses or the like or may be allowed to run to waste.

Referring now to FIG. 7 of the drawings, this shows the method of connecting the droppers 21 to the milk line when a continuous water-jacket 20 is used. In this embodiment a circular hole 25a is provided in the wall of the water-jacket 20 through which protrudes the connecting pipe 25 to the milk line 3. The joint between the pipe 25 and the outer wall of the water-jacket is sealed by a weld.

Figure 8:
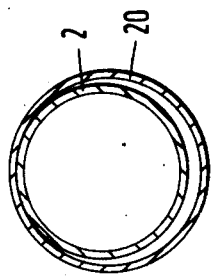
FIG. 8 is a cross-sectional elevation of a milk line in accordance with an alternative embodiment of the invention not previously illustrated.

FIG. 8 shows an alternative arrangement of the milk line 3 and the outer water-jacket 20. In this arrangement the pipes are disposed eccentrically of each other with the top wall portion of the inner pipe 3 welded to the inside of the top portion of the outer pipe 20 to leave a water passage which is substantially crescent-shaped in cross-section. It will be appreciated that when the milk line is disposed substantially horizontally the milk will flow in the lower half of the line so that with this arrangement maximum heat transfer between the milk and water is obtained. While the arrangements shown in FIGS. 7 and 8 have been described with reference to the embodiment shown in FIG. 6, it will be appreciated that they are also applicable to the other embodiments and, of course, a continuous water-jacket 21 may be used in place of the individual consecutive water-jackets shown in the embodiments of FIGS. 2 and 5.

Referring now to FIG. 9, this shows a dropper 2 provided with a water-jacket 21. The dropper comprises a flexible section 2a made from rubber or other flexible material. The section 2a is connected to the milk-line connection 25 as described with reference to FIG. 7. The flexible section 2a is connected to an intermediary section 2b which is made of stainless steel and which in turn is connected to further flexible section 2c which is joined to the teat-cup cluster 1 in a well-known manner. This arrangement is common to all three embodiments described herein and provides for the necessary freedom of movement of the teat-cup cluster 1. The intermediary section 2b of the dropper, which is of tubular cross-section, is enclosed within, and arranged concentrically with an outer water-jacket 21. The water-jacket may have a diameter of, for example, 22 mm while the dropper section 2b has a diameter of 16 mm. The water-jacket 21 may have a length of, for example, 1.16 m. Cold water enters the top of the water-jacket 21 through line 47 and leaves the water-jacket at the bottom through pipe 48. With a view to making the apparatus as neat and compact as possible, the water line 48 is preferably disposed in contact with, and is welded to, the outer wall of the water-jacket 21.

The invention is not restricted to the various embodiments described as it will be appreciated that other arrangements may be used without departing from the scope of the invention. For example, it is possible to use either a continuous or broken water-jacket on the milk-line, and the provision of a water-jacket on the milk line subsequent to the receiving jar is optional. The disposition of gate-valves may be changed to suit the needs of the individual user who has a choice of obtaining maximum cooling of the milk or heating of the water over various sections of the apparatus, as he desires. Existing conventional milking installations can conveniently be adapted in accordance with the invention as it has been found that the cost involved in the case of new installations may very quickly be recovered by the savings in electrical energy and increased prices obtained for uncontaminated milk.

I claim:

1. Milking apparatus comprising a milk line for conveying milk from a plurality of teat-cup clusters to a receiving vessel, comprising a milk conduit, means for separately attaching each of a plurality of teat-cup clusters to said conduit at spaced points along said conduit for flow of milk in one direction through said conduit, a water-jacket surrounding said conduit, means to introduce relatively cold water into said jacket for flow of water through said jacket in a direction opposite to said one direction, means for withdrawing from said water-jacket relatively warm water heated by the milk in the milk conduit, a dropper line connected to each of a plurality of said connecting means for connecting a said connecting means to a teat-cup cluster, and a water-jacket about each said dropper line.

2. Milking apparatus as claimed in claim 1, said water-jacket being in a plurality of sections, said connecting means being secured to the portions of said milk line which are disposed between said sections.

3. Milking apparatus as claimed in claim 1, the cross-sectional area of the interior of said conduit being greater than the cross-sectional area of the interior of said water-jacket.

4. Milking apparatus as claimed in claim 3, the water-jacket being annular and the milk line being tubular in cross-sectional configuration and the ratio of their diameters being about 6:5.

5. Milking apparatus as claimed in claim 1, the water-jacket and the milk line being tubular and being in eccentric relationship to each other with the top outer wall of the milk line in contact with the top and inner wall of the water-jacket to leave a substantially crescent shaped water passage around the lower portion of the milk line.

6. Milking apparatus as claimed in claim 5, the ratio of the diameter of the water-jacket to that of the milk line being about 6:5.

* * * * *